(12) United States Patent
Juanarena Saragueta et al.

(10) Patent No.: US 7,518,256 B2
(45) Date of Patent: Apr. 14, 2009

(54) CONTROL AND PROTECTION OF A DOUBLY-FED INDUCTION GENERATOR SYSTEM

(75) Inventors: Javier Juanarena Saragueta, Ororbia (ES); Jose Ignacio Llorente Gonzales, Plencia (ES)

(73) Assignee: Gamesa Innovation & Technology, S.L., Pamplona (Navarra) (ES)

( * ) Notice: Subject to any disclaimer, the term of this patent is extended or adjusted under 35 U.S.C. 154(b) by 15 days.

(21) Appl. No.: 10/563,043

(22) PCT Filed: Jul. 1, 2004

(86) PCT No.: PCT/EP2004/007208

§ 371 (c)(1),
(2), (4) Date: Dec. 30, 2005

(87) PCT Pub. No.: WO2005/015730

PCT Pub. Date: Feb. 17, 2005

(65) Prior Publication Data

US 2006/0192390 A1 Aug. 31, 2006

(30) Foreign Application Priority Data

Jul. 15, 2003 (EP) .................................. 03380174

(51) Int. Cl.
*F03D 9/00* (2006.01)
*H02P 9/04* (2006.01)
*H02P 11/00* (2006.01)

(52) U.S. Cl. .............................. 290/44; 290/55; 322/44; 322/28

(58) Field of Classification Search ................... 290/44, 290/55; 322/28, 26, 44; 416/132 B
See application file for complete search history.

(56) References Cited

U.S. PATENT DOCUMENTS

| | | | | |
|---|---|---|---|---|
| 3,894,274 | A | * | 7/1975 | Rosenberry, Jr. ............. 361/23 |
| 4,135,132 | A | | 1/1979 | Tafjord |
| 4,625,254 | A | | 11/1986 | Fahlen |
| 4,812,729 | A | | 3/1989 | Ito et al. |
| 5,544,120 | A | | 8/1996 | Kuwagta et al. |
| 5,734,256 | A | | 3/1998 | Larsen et al. |

(Continued)

FOREIGN PATENT DOCUMENTS

CA 1 124 781 6/1982

(Continued)

OTHER PUBLICATIONS

English Abstract of DE 102 06 828 dated Aug. 14, 2003.

(Continued)

*Primary Examiner*—Julio C. Gonzalez
(74) *Attorney, Agent, or Firm*—Ladas & Parry LLP

(57) ABSTRACT

A control system for a double-fed induction generator (DFIG) comprising a rotor (1) having rotor windings and a stator (2) having stator windings connectable to a grid for electric power distribution. The control system comprises a converter (17-0, 171), having a clamping unit comprising at least one passive voltage-dependent resistor element (291, 292, 293, 294) for providing a clamping voltage over the rotor windings when the clamping unit is triggered. The invention also relates to a double-fed induction generator (DIFIG) system and to a method for protecting the converter in a power generation system.

19 Claims, 7 Drawing Sheets

U.S. PATENT DOCUMENTS

| | | | |
|---|---|---|---|
| 6,226,166 B1 * | 5/2001 | Gumley et al. | 361/118 |
| 6,847,128 B2 * | 1/2005 | Mikhail et al. | 290/44 |
| 6,856,040 B2 * | 2/2005 | Feddersen et al. | 290/44 |
| 7,015,595 B2 * | 3/2006 | Feddersen et al. | 290/44 |
| 7,106,572 B1 * | 9/2006 | Girard | 361/118 |
| 2004/0008009 A1 * | 1/2004 | Fukaya | 322/44 |
| 2005/0116476 A1 * | 6/2005 | Feddersen | 290/44 |
| 2005/0236838 A1 * | 10/2005 | Rosebrock et al. | 290/44 |
| 2006/0067021 A1 * | 3/2006 | Li et al. | 361/30 |
| 2006/0163881 A1 * | 7/2006 | Bucker et al. | 290/44 |
| 2006/0214428 A1 * | 9/2006 | Altemark et al. | 290/44 |
| 2007/0052244 A1 * | 3/2007 | Hudson | 290/44 |

FOREIGN PATENT DOCUMENTS

| | | |
|---|---|---|
| DE | 197 35 742 | 2/1999 |
| DE | 102 06 828 | 8/2003 |
| JP | 7-67393 | 3/1995 |
| JP | 7-194196 | 7/1995 |

OTHER PUBLICATIONS

English Abstract of DE 197 35 742 dated Feb. 25, 1999.
Computer-Generated English Translation of Claims and Specification and Patent Abstracts of Japan of 7-194196 dated Jul. 28, 1995.
Computer-Generated English Translation of Claims and Specification and Patent Abstracts of Japan of JP7-67393 dated Mar. 10, 1995.
Weiss, H. "Rotor Circuit GTO Converter for Slip Ring Induction Machine" *EPE'97 (Trondheim)* pp. 2717-2728.
Pena, R.S. et al. "Vector Control of a Variable Speed Doubly-Fed Induction Machine for Wind Generation Systems" *EPE Journal* (1996) vol. 6, No. 3-4, pp. 60-67.
Voltage Dependent Resistor On GlobalSpec, GlobalSpec offers a variety of voltage dependent resistor for engineers and . . . Chip resistors are passive resistors with a form factor of an integrated . . . http://semiconductors.globalspec.com/Industrial-Directory/voltage_resistor Oct. 27, 2007.
Light Depenent Resistor Ldr On GlobalSpec, GlobalSpec offers a variety of light dependent resistor ldr for . . . Chip resistors are passive resistors with a form factor of an integrated circuit (IC) . . . http://optical-components.globalspec.com/Industrial-Directory/light_1... Oct. 27, 2007.
Modeling of Voltage-Dependent Diffused Resistors—Electron . . . , passive components such as polysilicon resistors, n- or p-type diffused . . . An equivalent circuit model of the voltage-dependent resistor . . . http://ieeexplore.ieee.org/Xplore/login.jsp?url=/ie13/16/14065/00644657.pdg?arnumbr=6... Oct. 27, 2007.
Fuse Manufactures, Circuit Breaker, Holders, Passive Fuses, The listing is subdivided into Passive, and Mechanical . . . A varistor may also be called a VDR [Voltage Dependent Resistor]. Varistors will have a negative . . . http://www.interfacebus.com/mechanical_fuse.html Oct. 27, 2007.
Resistor Ceramic Resonator Saw filter Dielectric Coils Inductor Voltage Resistors—Load Withstanding Surge High Voltage Resistors voltage . . . CDS PGM Series—Light Dependent Resistors (LDR), Photo Resistor (CDS) . . . http://www.tokenchina.com/ Nov. 2, 2007.

* cited by examiner

CONTROL AND PROTECTION OF A DOUBLY-FED INDUCTION GENERATOR SYSTEM

TECHNICAL FIELD

The invention relates to the control of a Double-fed Induction Generator (DFIG), especially for use in wind-power generation.

STATE OF THE ART

One of the basic problems involved with the generation of electric energy using wind-power is the fact that the turbine speed should be able to vary according to the wind speed, in order to improve energy efficiency and reduce the mechanical loads on the wind-turbine. However, in spite of the variations in turbine speed, the output power from the wind-power generator should be kept at a constant frequency, corresponding to the frequency of the electric power distribution network or grid to which the generator is coupled. That is, Variable Speed Constant Frequency (VSCF) is desired. In wind-power generation, in order to achieve VSCF operation, Double-fed Induction Generators (DFIGs) have been used; systems involving DFIGs are disclosed in, for example:

Pena, R. S., et al., "*Vector Control of a Variable Speed Doubly-Fed Induction Machine for Wind Generation Systems*", EPE Journal, Vol. 6, no 3-4, December 1996, pp. 60-67

Weiss, H., "*Rotor Circuit GTO Converter for Slip Ring Induction Machines*", ENE-97 (Trondheim), pp. 2717-2728

JP-A-07-067393

JP-A-07-194196

A conventional DFIG system is shown in FIG. 1. A rotor 1 of a generator comprising an electric multiphase (in this case, 3-phase) asynchronous machine is connected, through a gearbox 4, to a shaft 5 driven by the blades 3 of a wind-turbine. The windings of the stator 2 of the generator are connected, through a switch 6, to output lines 100 connected to a transformer 101 by means of which the output lines are connected to the electric power distribution network or grid 102, normally a medium voltage (10 kV-40 kV) grid. The voltage on the output lines from the stator is normally in the order of 690 V (considered to be the normal operation voltage level of the stator).

The system further includes a converter 7 having a rotor-side inverter or rotor-inverter (71, 72, 73) connected to the windings of the rotor through control lines 8, each control line including an inductor 9. The converter 7 further comprises a grid-side inverter or grid-inverter (74, 75, 76) connected to the above-mentioned output lines 100 (and, thus, to the grid) through grid-inverter connection lines 103, coupled to a transformer 104 (typically, for transforming from a level of 480 V on the converter side to 690 V on the output line side). The transformer is connected to the output lines 100 through a switch arrangement comprising two switches arranged in parallel: a main switch 105 arranged directly between the output lines 100 and the transformer 104, and a charge switch 106 connected in series with a charge resistor 107. That is, the grid-inverter is connected to the grid and to the stator windings, through the transformer 104.

The two inverters are, basically, symmetrical; each one of said rotor-inverter and grid-inverter comprises three half-bridges (71, 72, 73; 74, 75, 76) connected in parallel, one half-bridge for each phase of the generator and grid, respectively.

The rotor-inverter (71, 72, 73) is fed by a DC-link 77. The grid-inverter (74, 75, 76) controls the voltage over the DC-link 77.

Each half-bridge (71, 72, 73; 74, 75, 76) is made up of two identical units connected in series, each unit comprising an IGBT (Insulated Gate Bipolar Transistor) 78 connected in parallel with a free-wheel diode 79.

Between the two units making up each half-bridge, the half-bridge is connected to:
  the respective control line 8 (for half-bridges 71-73 of the rotor-inverter); or
  the respective grid-converter connection line 103 (for half-bridges 74-76 of the grid-inverter).

The operation of the IGBTs 78 of the inverters (71-76) is controlled by a control module 80, arranged to receive a plurality of input signals corresponding to the values of several parameters of the system, including:

$I_G$: current in the output lines 100 at the point of connection to the transformer 101 for connection to the grid (considered to be the "current-supplied to the grid");

$U_G$: voltage in the output lines 100 (considered to be the "voltage supplied to the grid");

$I_S$: current in the output lines 100 at the end connected to the stator, between the switch 6 and the connection to the branch for supplying the converter (via the switches 105 and 106 and transformer 104) (considered to be the "stator current");

$U_S$: stator voltage, measured at the stator windings (between the stator 2 and the switch 6);

$I_L$: current in the control lines 8 connecting the rotor windings and the rotor inverter to each other; and the rotational velocity of the rotor, measured by an encoder 85.

With these inputs, the control module 80 can control the PWM (Pulse Width Modulation) of the two inverters.

The control module 80 receives a power reference signal (PRS) coming from the main wind-turbine controller (not shown in FIG. 1), which is arranged to receive information such as the actual power-supplied by the generator, the positions of the blades, wind-speed, etc. The main wind-turbine controller is responsible for the total operation of the wind-turbine and controls a plurality of sub-controllers, including the converter 7.

In the converter 7, the power reference signal is compared with the measured power (based on the measured values of $I_G$ and $U_G$) and the output of a power regulation loop of the control module 80 controls the PWM of the rotor-inverter. The DC-link is controlled by the grid-inverter. The DC-link voltage is constant when the converter operates under normal conditions. In the circuit of the present example (FIG. 1), the DC-link voltage can, under normal conditions, be around 800 $V_{DC}$.

Basically, the converter 7 operates as follows:

To initiate operation of the converter, the charge switch 106 is closed. Then the DC-link 77 will be charged over the charge resistor 107 and the free-wheel diodes 79 of the grid-inverter. The voltage over the DC-link is measured by the control module 80. When the voltage over the DC-link reaches a pre-determined level, the main switch 105 is closed and the charge switch 106 is opened.

After the main switch 105 is closed, the grid-inverter is started and the DC-link voltage will be controlled by the grid inverter, so as to keep the voltage over the DC-link at a rated value (in this example, around 800 $V_{DC}$). The grid-inverter can supply the grid with power (like a generator) or it can take power from the grid (like a motor). The grid-inverter operates in accordance with the voltage over the DC-link: if this voltage tends to increase (due to input from the rotor-inverter), the grid-inverter supplies power to the grid; if the voltage over the DC-link tends to decrease, the grid-inverter takes power from the grid.

If the voltage over the DC-link is the same as the rated value ($800\,V_{DC}$) and the wind-turbine rotates within its pre-defined speed range, the rotor-inverter is started; that means that the control module 80 starts to operate the PWM of the rotor-inverter, triggering and not triggering, respectively, each IGBT 78 of the halfbridges (71-73) of the rotor-inverter. With the resulting rotor-current/rotor-voltage, the control module 80 controls the stator-side (as the generator acts as a transformer). On the stator-side, the control module 80 measures an AC voltage (Us in the drawings, sometimes also known as $U_{SYNC}$) and controls the rotor-inverter (adjusting the PWM) until this stator voltage Us is identical with the grid-voltage $U_G$. Once both voltages are identical, the switch 6 is closed, thus connecting the stator windings to the grid. With the PWM of the rotor-inverter it is now possible to control the active and reactive power of the total power supplied to the grid.

The power-electronic components of the converter 7 need to be protected against high currents (over-currents) and overvoltages that can appear in the control lines 8 connecting the rotor windings with the rotor-inverter. For example, if there is a short-circuit in the grid 102, the generator 2 feed high stator-currents ($I_S$) into the short-circuit and the rotor-currents increase very rapidly. In order to protect the generator and the converter, the switch 6 connecting the generator to the grid is then opened, but there is a substantial delay (typically around 50 ms) before disconnection actually takes place, and during this time, the high rotor-currents can harm the converter.

In order to protect the converter, it is known to provide the converter 7 with a so-called "crowbar" 90, arranged so as to short-circuit the rotor windings, when necessary, so as to absorb the rotor-currents and prevent them from entering the rotor-inverter and harming components thereof. A typical example of the basic layout of a known crowbar is shown in FIG. 2. Basically, the crowbar comprises three branches arranged in parallel, each branch comprising two diodes (91, 92; 93, 94; 95, 96) connected in series. Between the two diodes in each branch, there is a point of connection of the crowbar to the respective rotor winding. In series with the three branches comprising the diodes, there is a further branch comprising a power thyristor 98 and, optionally, a resistor 97. The crowbar is operated in the following manner:

In normal operation, the thyristor 98 is blocked, so that no current flows through the thyristor. Thus, no currents can flow through the diodes 91-96, and the rotor-currents are all fed to the rotor-inverter (71-73) of the converter 7, through the control lines 8. Now, when there is a large increase in the rotor-currents, these currents overload the IGBTs of the rotor-inverter and the PWM of the IGBTs 78 will be stopped (that is, the operation of the IGBTs is stopped) by the control module 80 (the control module 80 reads the value of the current $I_L$ through the control lines 8 and is programmed to stop operation of the IGBTs when said currents rise above a certain level). The rotor-currents will then flow through the free-wheel diodes 79, causing the voltage over the DC-link 77 to increase. This increase Is detected by the control module 80, and once the voltage over the DC-link reaches a predetermined threshold, the control module fires the power thyristor 98 of the crowbar, permitting the currents to flow through said thyristor. Then, the high rotor-currents will start to flow through the diodes of the crowbar instead of through the rotor-inverter. The rotor-voltage will be nearly zero, as the crowbar acts as a shortcircuit.

Next, the switch 6 is opened, thus disconnecting the stator 2 from the grid; the generator will then be demagnetised over said switch 6 and the crowbar 90. After this, the generator can be connected to the grid again, once the grid-voltage has returned to the rated value.

FIGS. 3A-3G show, using the same time axis, the development of some of the parameters of a system according to FIG. 1 with a prior art crowbar as per FIG. 2, when a short-circuit is produced in the grid. The following points of time are referred to:

t1: time when the short-circuit occurs in the grid
t2: time when the crowbar is triggered
t3: time when the generator is disconnected from the grid (by opening switch 6)
t4: time when the generator is reconnected to the grid (by closing switch 6)

FIG. 3A shows the drop of $U_G$ by the time t1 (time for short circuit in the grid).

FIG. 3B shows the stator-current $I_S$. At t1, the stator-current starts to increase rapidly and it remains on a high level until the time t3, when the switch 6 is opened, thus disconnecting the stator from the grid (then, the stator-current is interrupted). Later, once the voltage on the grid has returned to its rated value, the generator is reconnected to the grid (at t4) and the stator-currents start to flow again.

FIG. 3C shows how the rotor-current $I_R$ changes almost in the same way as the stator-current (due to the fact that the rotor and stator act as the primary and secondary sides of a transformer). The only difference is due to the fact that the magnetising current for the generator is coming from the rotor-side. Thus, in FIG. 3C, shortly before t4, a small magnetising current can be observed.

FIG. 3D shows the current from the rotor to the rotor-inverter ($I_L$). At t1, this rotor-inverter current increases rapidly (following the increase in the rotor-currents, which are all fed to the rotor-inverter). The rotor-inverter is stopped by the control module 80 and the current then flows through the free-wheel diodes 79, into the DC-link. The voltage over the DC-link ($U_{DC}$) (cf. FIG. 3E) increases very fast, until it reaches a certain level. Then, by the time t2, the crowbar is triggered by the control module (which has been reading the voltage over the DC-link). The rotor-current is then commutated into the crowbar (and $I_L$ almost immediately sinks to zero, that is, no current is fed from the rotor into the converter 7). Once the voltage is back on the grid, the rotor-inverter starts to supply the magnetising current to the rotor of the generator, and synchronises with the grid. After connection of the generator to the grid (at t4), the rotor-current increases again to the rated value (cf. FIG. 3C) (if there is enough energy in the wind).

In FIG. 3E, it is shown how, at t1, the DC-link is charged rapidly (the voltage $U_{DC}$ over the DC-link thus increases). At t2, the crowbar is triggered and the charging is stopped. The discharging of the DC-link is done by the grid-inverter. The grid-inverter discharges the DC-link down to the rated value ($800\,V_{DC}$).

FIG. 3F shows the current through the crowbar $I_{CR}$. By the time t2, the crowbar overtakes the total rotor-current.

Finally, FIG. 3G shows the rotor-voltage $U_R$. At the beginning, the rotor-voltage is at its normal operation level. At t1, the rotor-inverter is stopped and rectified rotor-voltage jumps to the level of the DC-link. The rotor-voltage increases with the voltage over the DC-link, until t2, when the crowbar is triggered; then, the rotor is short-circuited and the rotor-voltage sinks to zero. Once the switch 6 is opened and the generator is disconnected from the grid, the crowbar is opened again. Once the grid-voltage is back at its rated value again, the rotor-inverter is synchronised and the rotor-voltage is back at its normal operation level again.

The disconnection of the generator from the grid, as in the above example, has traditionally been used so as to protect the generator and converter when problems occur on the grid (such as short-circuits giving rise to rotor-current surges), and also for reasons related with the network management. Traditionally, the disconnection has not been considered to imply any substantial problems in what regards the over-all supply of power to the grid, as the wind-power generators have represented a very small part of the total power supplied to the grid (typically, below 5% of the total power supply). However, in many countries, wind-power generation is representing a rapidly increasing portion of the electric power generation; and in some countries the wind-power generation represents such an important part of the total power generation that sudden disconnection of the wind-power generators can cause severe problems to the over-all electric power distribution over the grid.

Thus, it is desired to provide an arrangement that can operate appropriately without the need for disconnecting the generator from the grid in the case of a short-circuit in the grid.

However, in the prior art arrangement described above and using the crowbar 90 for protecting the converter 7, it is necessary to disconnect the generator from the grid, as the triggered crowbar creates a hard short-circuit on the rotor side. If the stator were not disconnected from the grid, this short-circuit -of the rotor would produce a stable over-current in the rotor and stator windings. The rotor-voltage during normal operation is, with rated grid-voltage and slip, around 200 Vrms. If the rotor is short-circuited and if the stator is not disconnected from the grid, during a long time there will be over-currents in the order of, typically, three times the rated current. If the crowbar then is disconnected, these over-currents will "jump" into the rotor-inverter and produce an over-voltage on the DC-link 77. Then, the crowbar 90 will be triggered again, etc. Basically, there is no way of getting out of this loop. Thus, In order to avoid these long-time over-currents, the stator must be disconnected from the grid.

In the above-mentioned JP-A-07-067393 and JP-A-07-194196, the problem involved with the voltage drop in the grid is solved by means of adding a chopper circuit in parallel with the DC-link. The rotor-currents then flow through the free-wheel diodes of the rotor-inverter and charge the DC-link. When the voltage over the DC-link rises above a pre-determined level, a chopper in series with a resistor is activated and the voltage over the DC-link is limited by discharging the DC-link over the chopper circuit. However, this solution requires that the free-wheel diodes of the rotor-inverter are chosen so as to support high currents (as the rotor currents will continue to flow through the free-wheel diodes of the rotor-inverter). Further, the chopper needs a switch that can be switched off, like a GTO or IGBT, that is, an active switch. Further, for protection reasons, there must be a crowbar arranged in parallel with the rotor-inverter.

It is an object of the present invention to provide an arrangement that provides for protection of the converter without any need for disconnecting the stator from the grid in the case of a short-circuit in the grid, and which does not require any oversizing of the free-wheel diodes and, preferably, no active switch. Preferably, the arrangement should not require any crowbar.

DESCRIPTION OF THE INVENTION

A first aspect of the invention relates to a control system for a double-fed induction generator (DFIG) comprising a rotor having rotor windings and a stator having stator windings connectable to a grid for electric power distribution, said control system comprising a converter, said converter comprising the following components:

a rotor-inverter connectable to the rotor windings of the generator, a grid-inverter connectable to the grid and/or to the stator windings, and a DC-link for feeding the rotor-inverter.

According to the invention, the converter further comprises a clamping unit for protecting the converter from damage due to over-currents in the rotor windings, said clamping unit being connectable over the rotor windings and arranged to be triggered from a non-operating state to an operating state following detection of an over-current in the rotor-windings, said clamping unit comprising a clamping element arranged so that when the clamping unit is in its non-operating state, currents in the rotor windings cannot pass through said clamping element, and when the clamping unit is in its operating state, currents in the rotor windings can pass through said clamping element. The clamping element comprises at least one passive voltage-dependent resistor element for providing a clamping voltage over the rotor windings.

The voltage-dependent resistor element can be chosen so that, for any expected value of the rotor-currents occurring during short-circuit in the grid, an appropriate clamping voltage will be obtained over the clamping element and, thus, over the rotor windings. It is important that said clamping voltage be within a predetermined range. Especially, it should not be allowed to be too low, as a too low clamping voltage would imply that the currents in the rotor windings would decrease very slowly (as long as the stator remains connected to the grid). Actually, if the clamping voltage is below the level of the rotor voltage during normal operation, the rotor currents will never go down to zero.

It is desired that the rotor-currents decrease as rapidly as possible, so as to allow the converter to start to operate again, by means of bringing the clamping unit back to its non-operating state (whereby the rotor-currents are commutated to the rotor-inverter again), so that the converter can take over the control of the generator again. It is considered to be important that the converter will be able to take over the control of the rotor currents as soon as possible, so as to be able to control the power output to the grid also during the duration of the short-circuit on the grid (this is normally required by the operator of the grid).

It is thus important that the clamping element be a voltage-dependent resistor element, so that the voltage will not be a purely linear function of the rotor currents: the use of a normal resistor would imply that the clamping voltage would be (substantially) directly proportional to the rotor currents at each moment. Were a resistor chosen, care would have to be taken so as to choose a resistance value low enough to make sure that the clamping voltage would never exceed a maximum level allowed for the rotor-voltage, not even if the current flowing through the resistor would reach the highest level of rotor-current that could be expected. However, such a low value of the resistance might give rise to a too low level of the clamping voltage if the actual rotor-currents produced due to a short-circuit in the grid would be of a level much lower than said highest level that could be expected. In such a case, with a too low clamping voltage, the rotor-currents would not decrease rapidly enough so as to allow the converter to take over the control again, or at least not in order to take over the control as rapidly as one might desire. The use of a low resistance resistor would cause a high steady-state over-current in the rotor windings, at rated rotor-voltage.

However, using a voltage-dependent resistor element, it is possible to choose this element so as to provide a rather well-defined clamping voltage, within a rather short range, for a large range of possible rotor-currents. Actually, there are elements that can provide for a substantially constant clamping voltage for any value of the level of the rotor-current, within a very large range, basically including the full range of possible rotor-current levels that could be expected to occur due to a short-circuit in the grid.

Using a passive voltage-dependent resistor element is especially advantageous, as it provides for a rather well-defined clamping voltage without requiring any complex control of the clamping unit. Basically, it is enough to trigger the clamping unit so as to allow the rotor-currents to pass through the clamping unit instead of through the rotor-inverter. For triggering the clamping unit, a simple trigger element such as a power thyristor can be used, which can be arranged in series with the clamping element(s) and the respective rotor winding and be triggered from the control module using a very low current (for example, below 1 A, applied through a simple pulse-transformer). The clamping of the voltage over the rotor-windings is achieved by the voltage-dependent resistor element itself, and no further control is needed. That is, no "active" control of this clamping voltage is needed; once the stator-current is below its rated value, the control module can simply stop the triggering of the thyristors and, thus, stop the rotor-currents from flowing through the clamping unit after the next zero-crossing of the current through the thyristor.

The clamping element can comprise a plurality of passive voltage-dependent resistor elements, arranged in parallel, thereby allowing very high rotor-currents to flow through the clamping element without harming the individual passive voltage-dependent resistor elements.

The passive voltage-dependent resistor element(s) can (each) comprise:
  a varistor (or a plurality of varistors, connected in series);
  a zener diode (or a plurality of zener diodes, connected in series); and/or
  a suppression diode (or a plurality of suppression diodes, connected in series).

Examples of suitable passive voltage-dependent resistor elements are the following ones:
  varistor: B80K320 from the manufacturer EPCOS;
  suppression diode: BZW50-180 from the manufacturer ST
  zener diode: BZG05C100 from the manufacturer Vishay The clamping unit can comprise, for each phase of the rotor, a connector for connection to the respective rotor phase, each connector being connected to a trigger branch comprising, in series: a point of connection of the clamping unit to the connector for connection to the respective rotor phase; a thyristor for triggering the clamping unit; the clamping element; a diode; and the point of connection to the connector for connection to the respective rotor phase. The clamping unit can further comprise a resistor coupled in parallel with the clamping element.

The clamping unit can be arranged to be triggered from a non-operating state to an operating state:
  when the voltage over the DC-link rises above a pre-determined level (that is, the over-current in the rotor windings is detected by measuring the voltage over the DC-link);
  when the voltage over the rotor-windings rises above a pre-determined level (that is, the over-current in the rotor windings is detected by measuring the voltage over the rotor-windings).
  when the currents in the rotor-windings rise above a pre-determined level (that is, the over-current in the rotor windings is detected by measuring the currents in the rotor-windings); and/or
  when the currents in the stator-windings rise above a pre-determined level (that is, the over-current in the rotor windings is detected by measuring the currents in the stator-windings).

A second aspect of the invention relates to a double-fed induction generator (DFIG) system comprising a rotor having rotor windings and a stator having stator windings connectable to a grid for electric power distribution, said double-fed induction generator system further comprising a control system as described above, the rotor inverter being connected to the rotor windings of the generator, the grid inverter being connected to the grid, and the clamping unit being connected over the rotor windings.

A third aspect of the invention relates to a method for protecting the converter in a power generation system comprising a double-fed induction generator (DFIG) comprising a rotor having rotor windings, a stator having stator windings connected to a grid for electric power distribution and a control system comprising a converter, said converter comprising a rotor-inverter connected to the rotor windings of the generator, a grid-inverter connected to the grid and/or to the stator windings, and a DC-link for feeding the rotor-inverter. The method comprises the steps of:
  connecting a clamping unit having a clamping element over the rotor windings, said clamping unit comprising a clamping element arranged so that when the clamping unit is in its non-operating state, currents in the rotor windings cannot pass through said clamping element, and when the clamping unit is in its operating state, currents in the rotor windings can pass through said clamping element, said clamping element comprising at least one passive voltage-dependent resistor element for providing a clamping voltage over the rotor windings; and
  triggering the clamping unit to its operating state when an over-current is detected in the rotor windings.

The clamping unit can be triggered from a non-operating state to an operating state, for example,
  when the voltage over the DC-link rises above a pre-determined level,
  when the voltage over the rotor-windings rises above a pre-determined level,
  when the currents in the rotor-windings rise above a pre-determined level, and/or
  when the currents in the stator-windings rise above a pre-determined level.

DESCRIPTION OF PREFERRED
EMBODIMENTS OF THE INVENTION

Figure 1:
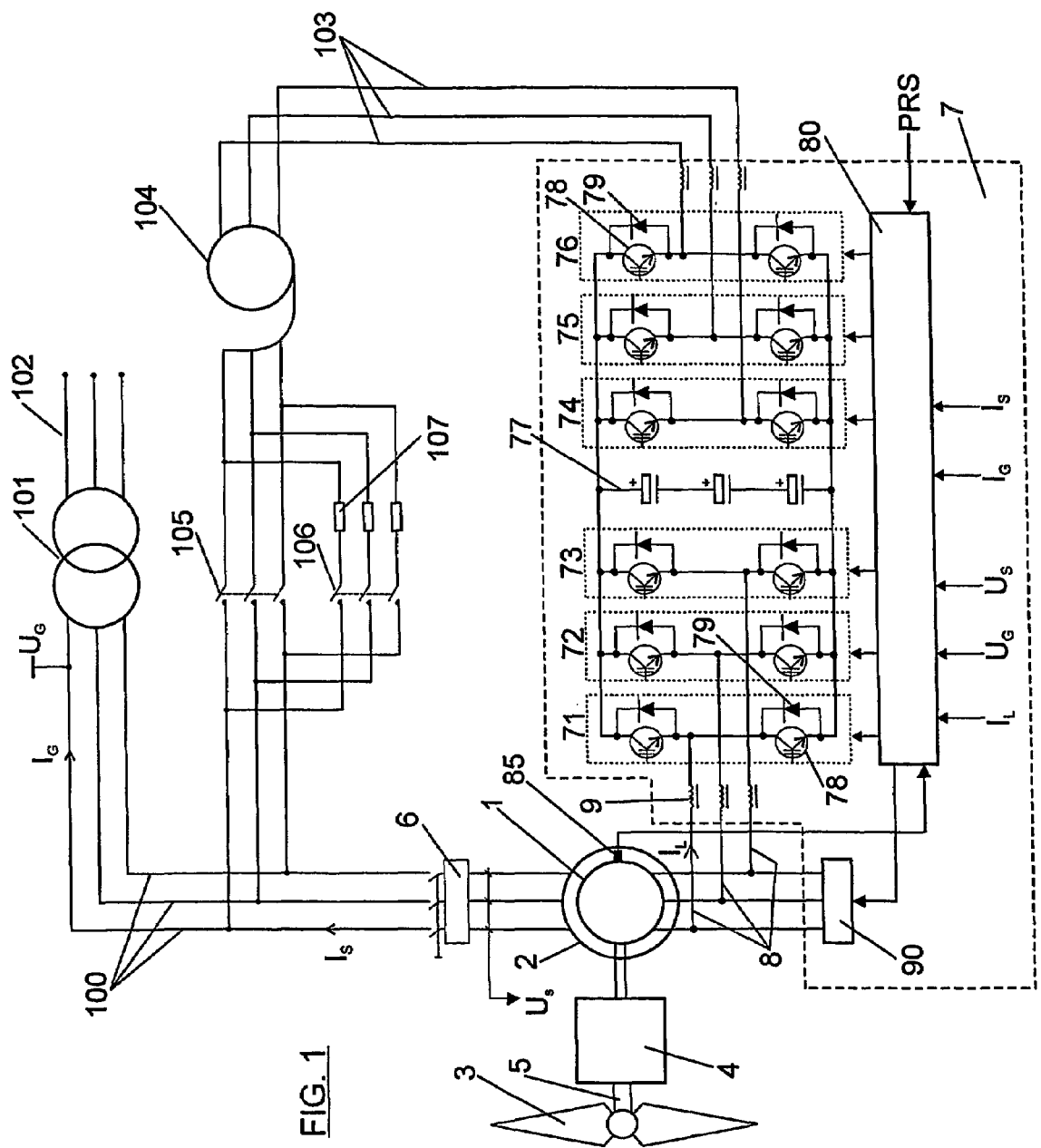
FIG. 1 schematically shows a DFIG system according to the state of the art.
Figure 2:
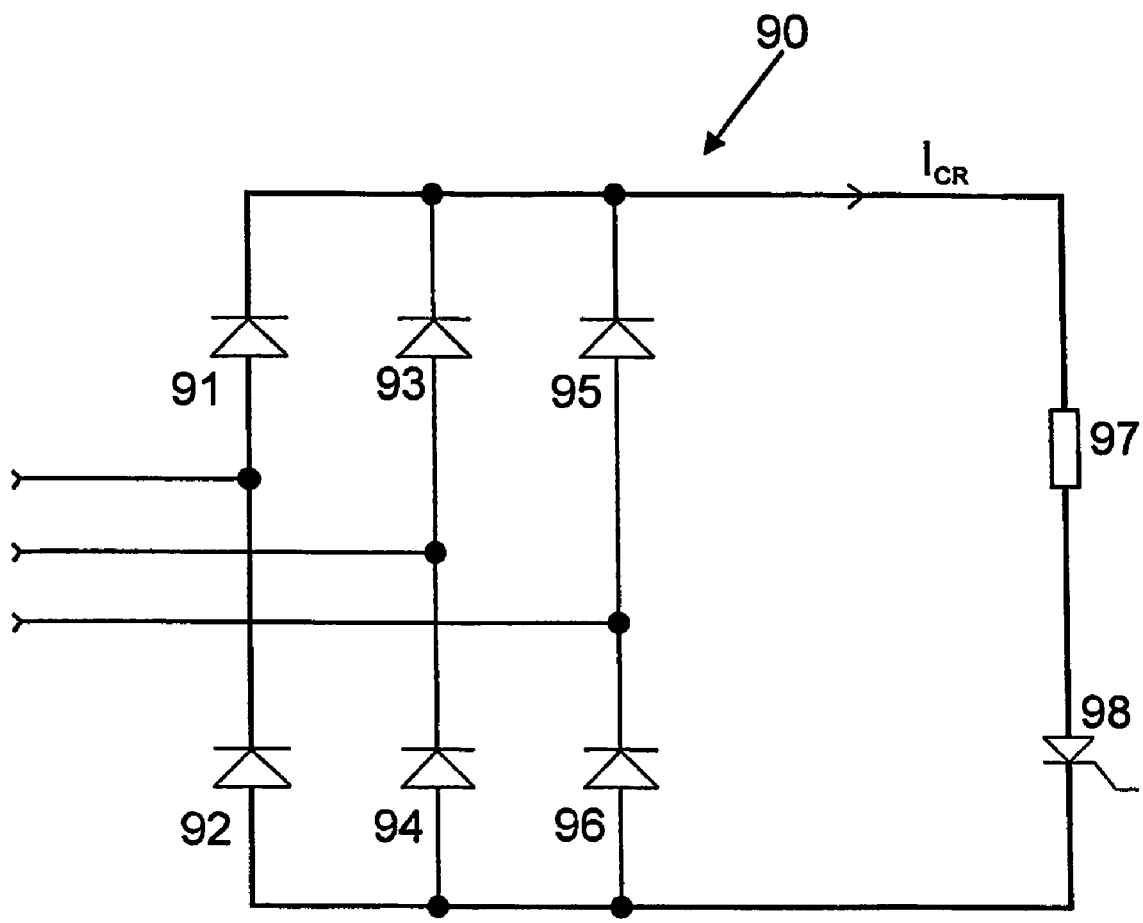
FIG. 2 schematically shows a crowbar according to the state of the art.
Figure 3A:
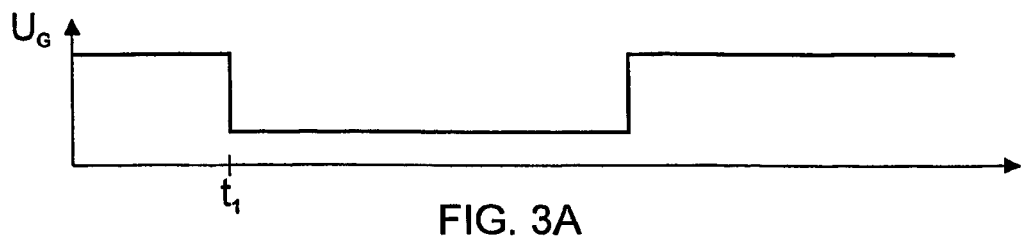
FIG. 3 schematically illustrates the changes in some of the parameters of the system according to the state of the art, during a time-period following a short-circuit in the grid.
Figure 3B:
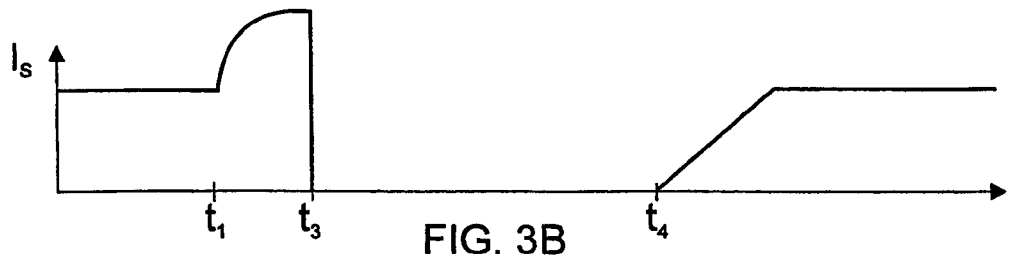
Figure 3C:
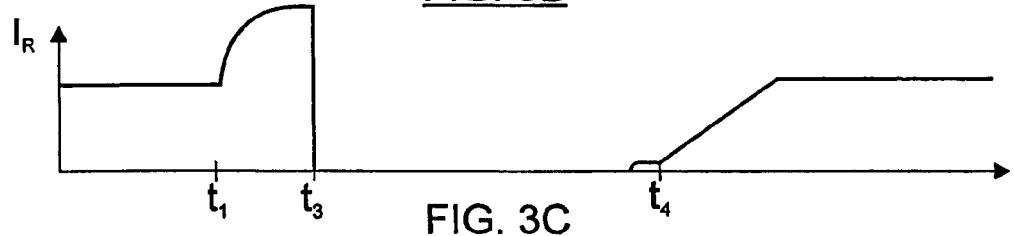
Figure 3D:
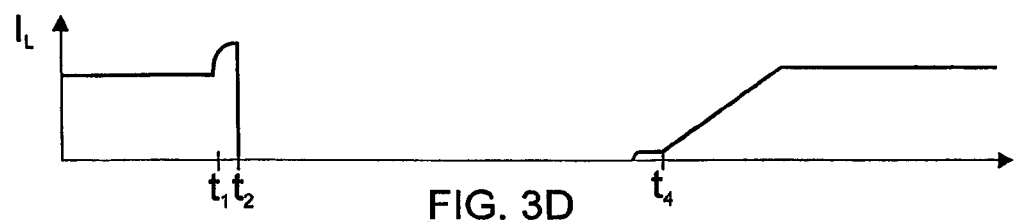
Figure 3E:
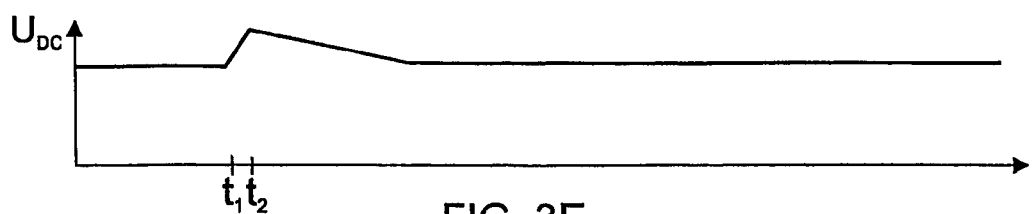
Figure 3F:
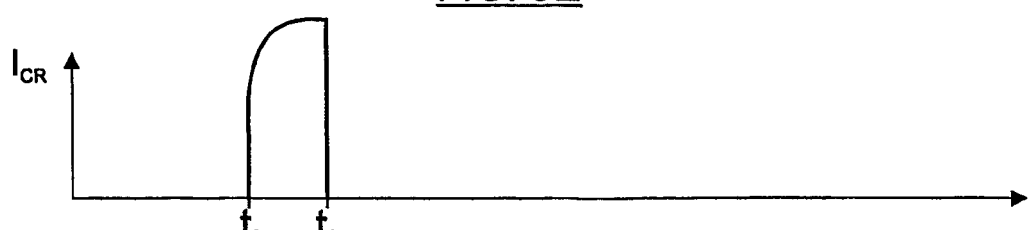
Figure 3G:
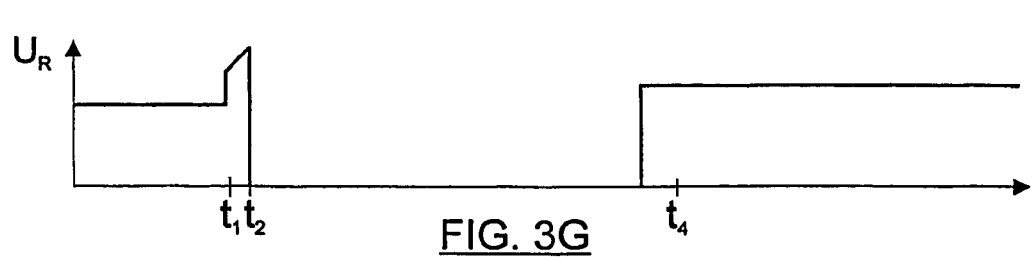
Figure 5:
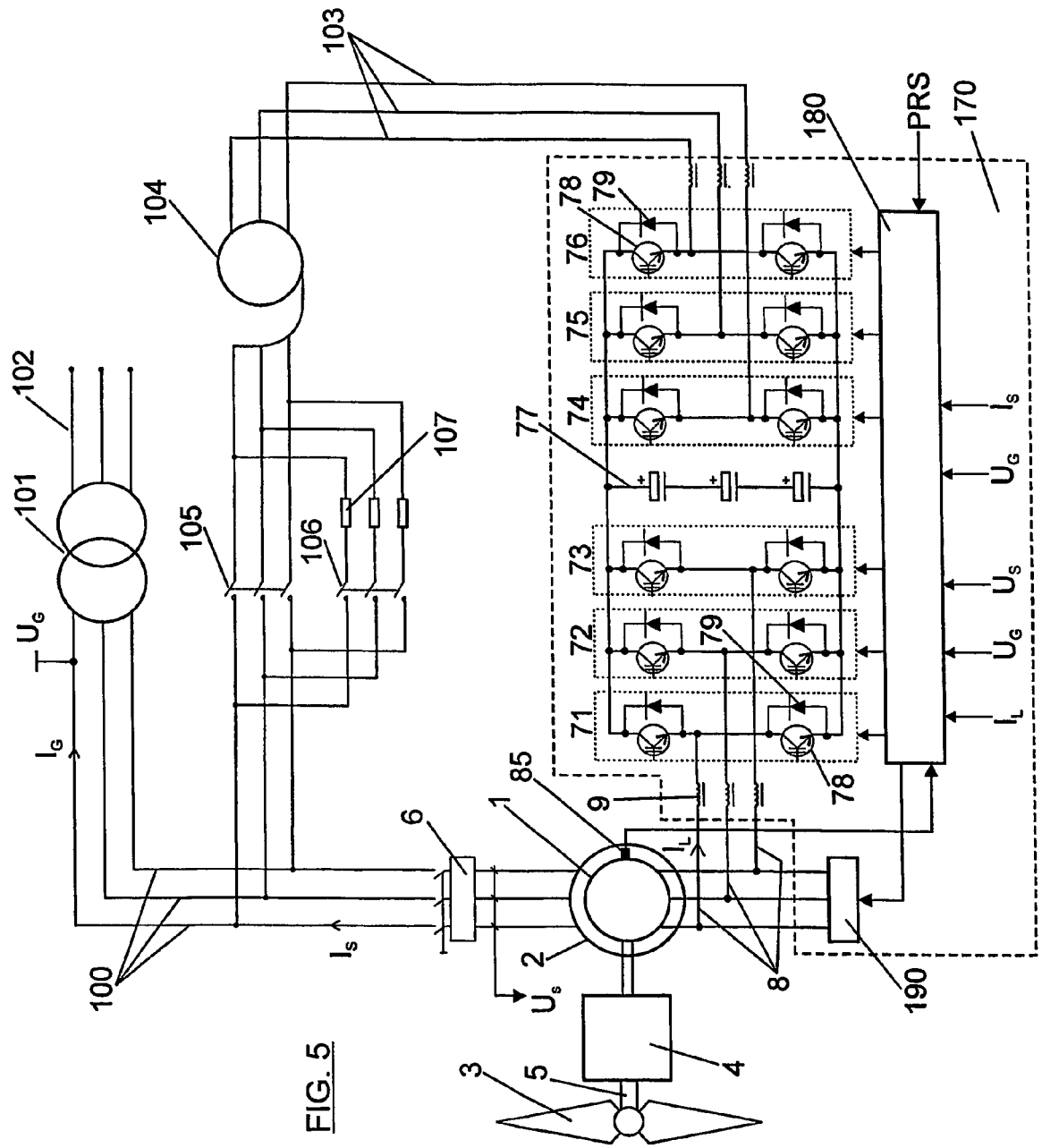
FIG. 5 schematically shows a system according to a preferred embodiment of the invention.
Figure 6:
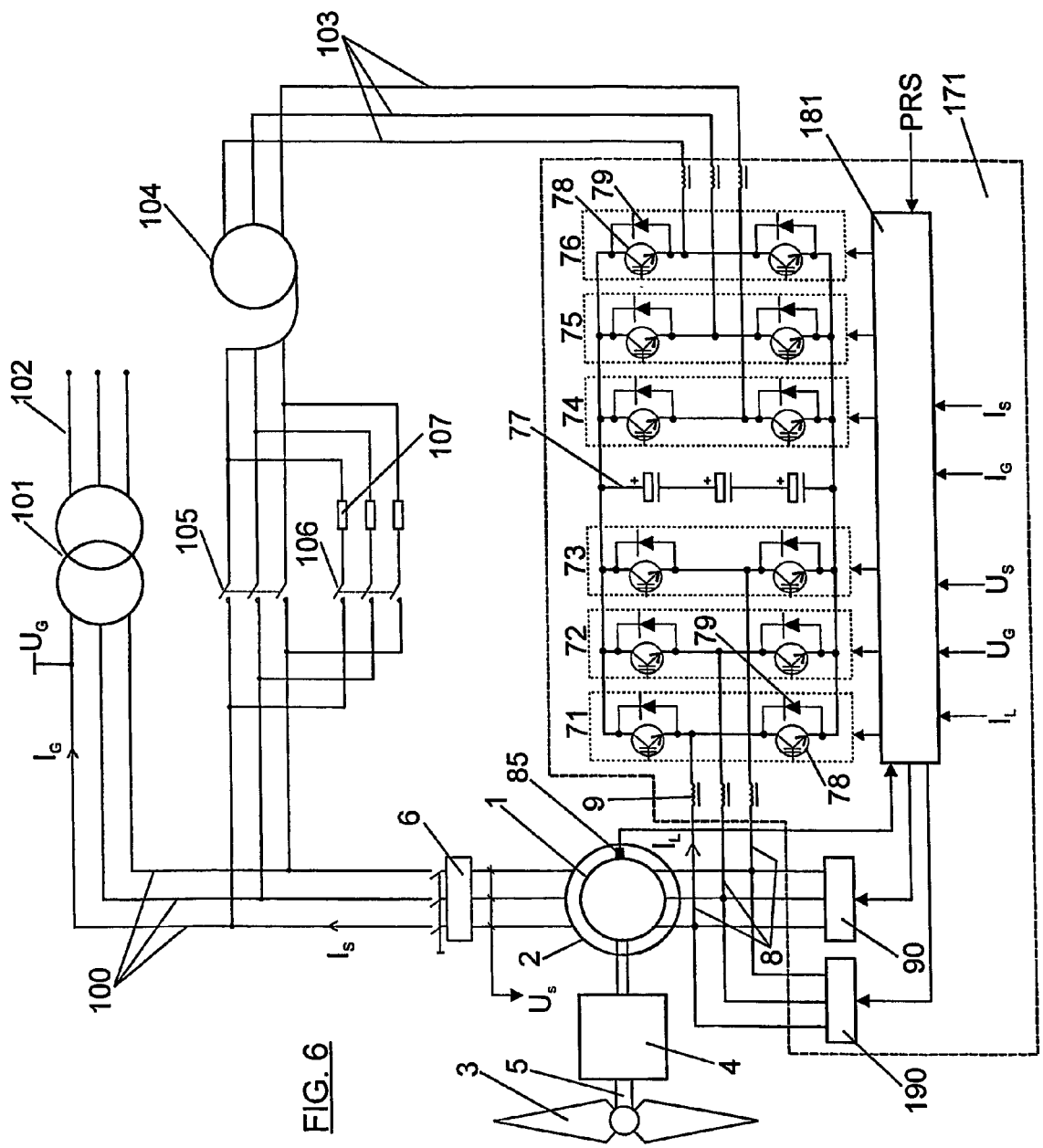
FIG. 6 schematically shows a system according to another preferred embodiment of the invention.

FIGS. 5 and 6 illustrate two preferred embodiments of the invention. Most of the illustrated components correspond exactly to those of the prior art system described referring to FIG. 1; these components bear the same reference numerals and need no further description. However, instead of the converter 7 of FIG. 2, FIGS. 5 and 6 illustrate converters comprising the same basic elements but:

FIG. 5 illustrates a converter 170 where the crowbar has been replaced by a clamping unit 190, the converter comprising a control module 180 adapted to control said clamping unit (apart from that, the control module 180 operates as the control module 80 of the system of FIG. 1); and FIG. 6 illustrates a converter 171 where a clamping unit 190 has been incorporated in parallel with the crowbar 90, the converter comprising a control module 181 adapted to control said clamping unit and crowbar (apart from that, the control module 181 operates as the control module 80 of the system of FIG. 1).

Figure 7:
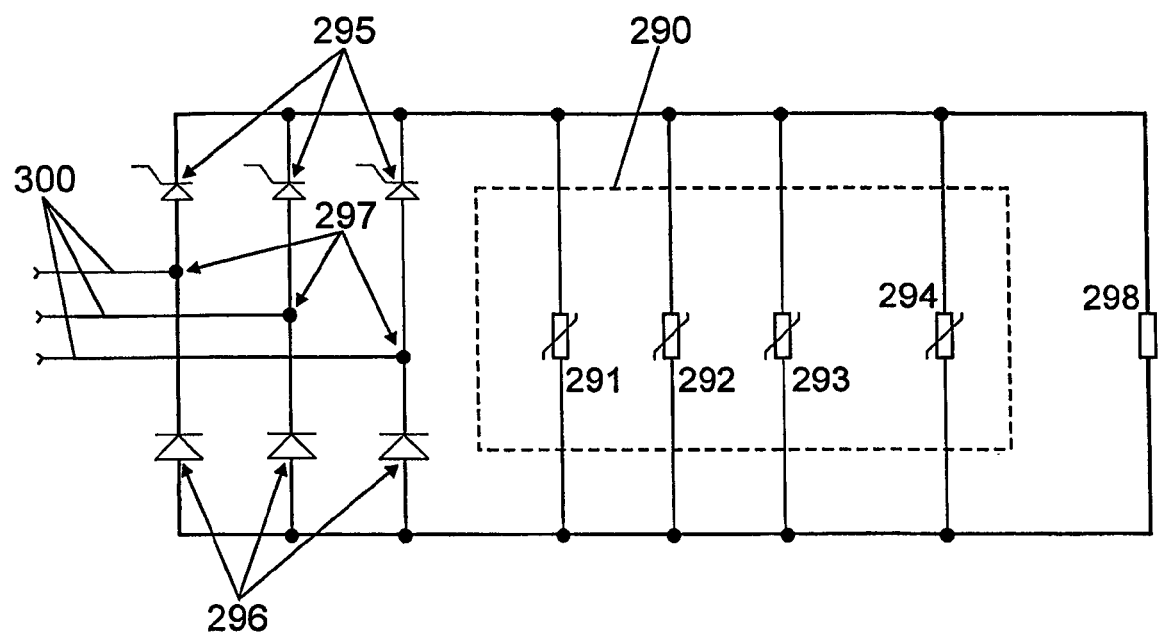
FIG. 7 schematically shows a clamping unit according to a preferred embodiment of the invention.

FIG. 7 illustrates a preferred embodiment of the clamping unit clamping unit comprising, for each phase of the rotor, a connector (300) for connection to the respective rotor phase. Each connector is connected to a trigger branch comprising, in series: a point of connection (297) of the clamping unit to the connector (300) for connection to the respective rotor phase; a thyristor (295) for triggering the clamping unit; the clamping element (290); a diode (296); and the point of connection (297) to the connector (300) for connection to the respective rotor phase.

The thyristor 295 and the diode 296 can be integrated in one single component, such as SKKH210/12E from Semikron. The clamping element 290 can be a varistor such as B80K320 from EPCOS.

(Instead of the diode 296, a thyristor could be used, with the advantage that the delay between the stopping of the triggering of the clamping unit and the actual stopping of the current flowing through the clamping unit is reduced by up to 50%, compared to when a diode is used).

Figure 4A:
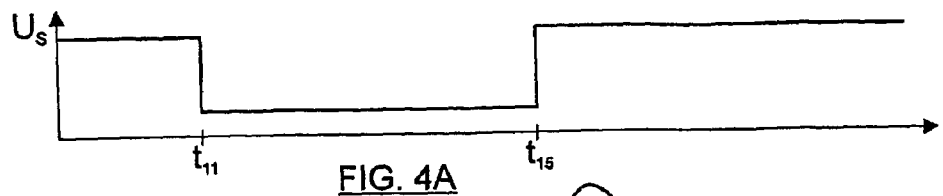
FIG. 4 schematically illustrates the changes in some of the parameters of the system according to a preferred embodiment of the invention, during a time-period following a short-circuit in the grid.
Figure 4B:
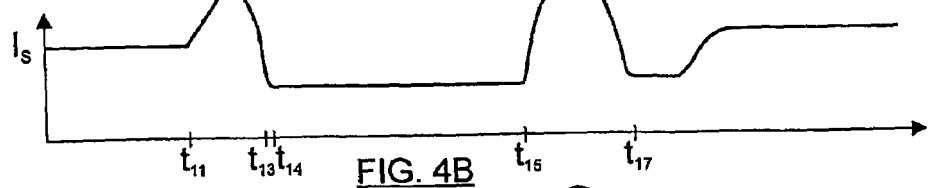
Figure 4C:
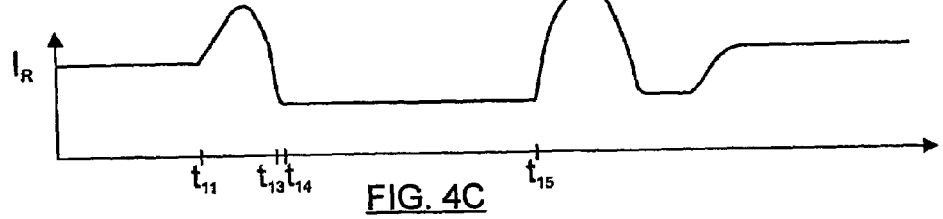

FIG. 4A shows the grid-voltage, with a short-circuit appearing by t11. Then, the stator-current $I_S$ (FIG. 4B) increases rapidly. However, in this case, the generator is not disconnected and will be demagnetized over the stator- and rotor-currents and the stator- and rotor-currents will then decrease. Once the stator-currents are below the rated level (approximately by t13) the clamping unit 190 will be opened by the control module (180, 181) and the rotor currents will flow into the rotor inverter again. The converter measures the rotor-currents (by measuring the currents $I_L$ in the control lines) and synchronises the PWM with those currents. The rotor-inverter controls the rotor-currents and provides for a constant rotor- and stator-current all through the remaining duration of the short-circuit (from t14 to t15 in FIGS. 4B and 4C). Later, when the grid-voltage returns to its rated value, the generator is not magnetised enough and from the grid a high current flows to the stator and produces an over-current (in the interval between t15 and t17 in FIG. 4C). The rotor-inverter is then stopped again, and the generator will be magnetised from the grid. After this, the stator-current decreases and, once it is under the rated value (t17), the clamping unit 190 is opened and the rotor-inverter overtakes the control of the rotor-current again.

The rotor-current ($I_R$) (FIG. 4C) is nearly the same as the stator-current.

Figure 4D:
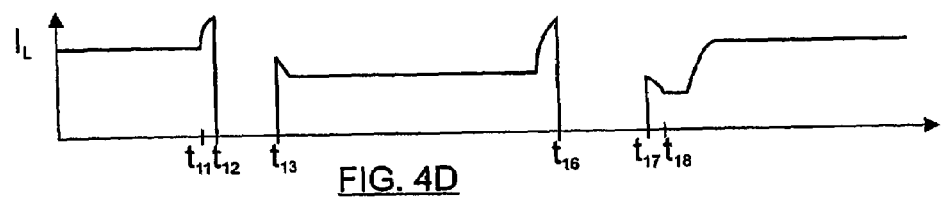

FIG. 4D shows the current $I_L$ to the rotor-inverter (that is, the current from the rotor to the converter). At t11, the rotor-current increases rapidly and at t12, the clamping unit 190 is triggered (just as the crowbar was triggered in the prior art system described above). Thus, the rotor-current is commutated into the clamping unit 190 and $I_L$ sinks to zero. Once the stator-current sinks below the rated current (t13), the clamping unit is opened by the control module (180, 181) and the rotor-current is commutated into the rotor-inverter. The rotor-inverter synchronises with the rotor-current and controls the current during the remaining part of the duration of the short-circuit (t14-t15). (In the time between t14 and t15, the grid operator requires that the wind-turbine actively supplies a current in the short circuit outside the wind-turbine, in order to provoke a more rapid disconnection of the short-circuit by opening a high voltage circuit breaker in the grid. Inter alia for this purpose, the generator should be controlled during most of the duration of the short-circuit. The invention allows the rotor-inverter to be stopped only in the transient times corresponding to the presence of the dynamic over-currents caused by fast voltage changes on the grid).

When the grid-voltage returns to its rated value (t15), the rotor-current increases rapidly and the rotor-inverter is stopped again (as an over-current is measured by the control module), the clamping unit 190 is triggered and overtakes the rotor-current. When the stator-current sinks below the rated level (t17), the clamping unit is opened and the rotor-current is commutated into the rotor-inverter again. The rotor-inverter synchronises with the actual rotor-current and starts to operate again, controlling the rotor-current.

Figure 4E:
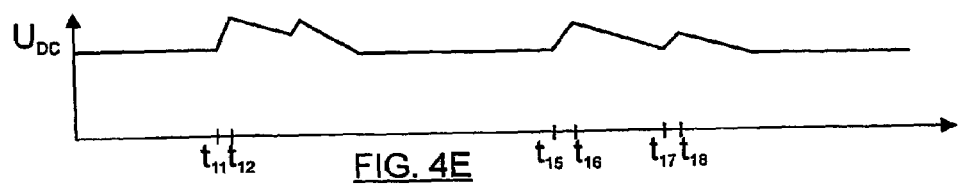

FIG. 4E shows the voltage over the DC-link. At t11, there is a first spike, which triggers the clamping unit 190 (at t12). Later, as described above, the clamping unit is opened and the rotor-current is commutated into the rotor-inverter again, starting to charge the DC-link again (t13), until the rotor-inverter overtakes the control of the rotor-current (this is by the control module—180, 181—, so as to overtake the control of the generator again). This happens two times in FIG. 4E, first due to the voltage drop on the grid and the second time when the grid-voltage rises again.

Figure 4F:
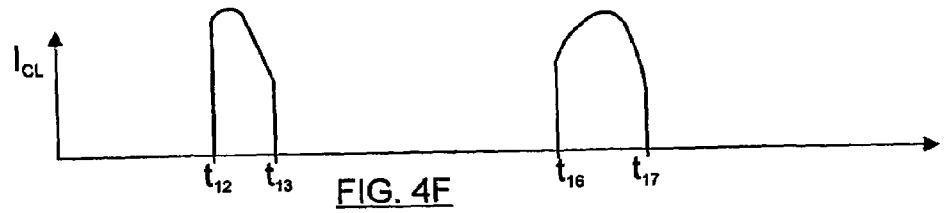

FIG. 4F shows the clamping current (current through the clamping unit) $I_{CL}$. The clamping unit overtakes the full rotor-current two times, as outlined above.

Figure 4G:
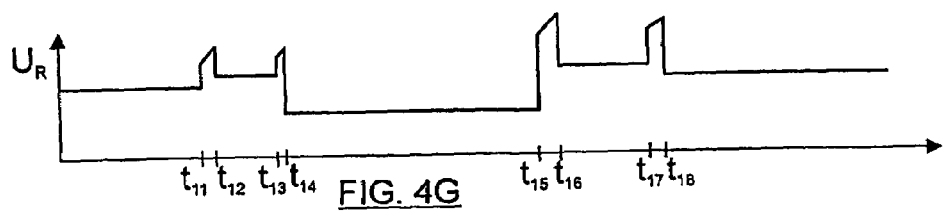

FIG. 4G shows the rotor-voltage $U_R$.

Initially, the rotor-voltage is at its normal operation level. By t1, the rotor-current increases and the rotor-inverter is stopped. The rotor-current is like a current source and flows over the free-wheel diodes 79, into the DC-link 77. Here, the rotor-voltage will be at the same level as the voltage over the DC-link.

The rotor-voltage increases with the increasing DC-link voltage and by t12, the clamping unit is triggered and the rotor-voltage is clamped to a level in accordance with the chosen characteristics of the clamping element 290. By t13 the clamping unit is opened and the rotor-current flows into the rotor-inverter and the rotor-voltage jumps to the level of the DC-link voltage. After a time for synchronising the rotor-inverter with the actual rotor-current, the rotor-inverter starts to work (t14) and the level of the rotor-voltage is returning to the level corresponding to normal operation. While the shortcircuit condition remains on the grid (t14-15), the "normal" rotor-voltage is lower then before t11, because of the drop of the stator-voltage.

When the voltage returns to the grid (t15), the system will react as by the voltage drop:

by t15, the rotor-current rises fast and the rotor-inverter is stopped; the rotor-voltage increases to the level of the DC-link voltage;

by t16, the clamping unit is triggered, and the rotor-voltage is clamped to a level defined by the characteristics of the clamping element 290;

by t17, the clamping unit is opened and the rotor-current flows into the rotor-inverter, and the rotor-voltage jumps to the level of the DC-link voltage;

finally, after the time for synchronising the rotor-inverter with the actual rotor-current, by t18 the rotor-inverter starts to work again)

Figure 4H:
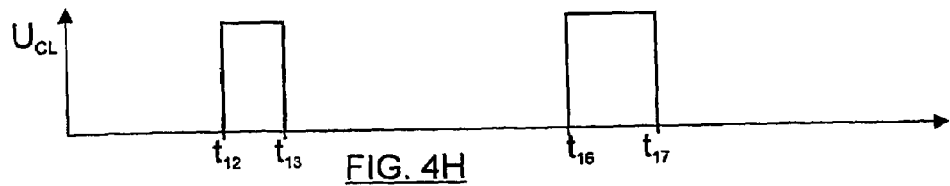

FIG. 4H shows the clamping voltage $U_{CL}$. Ideally, the clamping voltage will change between two well-defined levels, namely, between zero and a clamping level.

Throughout the description and claims of the specification, the word "comprise" and variations of the word, such as "comprising", is not intended to exclude other additives, components, integers or steps.

The invention claimed is:

1. A control system for a double-fed induction generator (DFIG) comprising a rotor (1) having rotor windings and a stator (2) having stator windings connectable to a grid for electric power distribution;

said control system comprising a converter (170, 171), said converter comprising the following components:

a rotor-inverter (71-73) connectable to the rotor windings of the generator, a grid-inverter (74-76) connectable to the grid and/or to the stator windings, and a DC-link (77) for feeding the rotor-inverter;

the converter (170, 171) further comprising a clamping unit (190) for protecting the converter from damage due to over-currents in the rotor windings, said clamping unit (190) being connectable over the rotor windings and arranged to be triggered from a non-operating state to an operating state following detection of an over-current in the rotor-windings, said clamping unit comprising a clamping element (290) arranged so that when the clamping unit is in its non-operating state, currents in the rotor windings cannot pass through said clamping element, and when the clamping unit is in its operating state, currents in the rotor windings can pass through said clamping element, the clamping unit further comprising for each phase of the rotor, a connector (300) for connection to the respective rotor phase, each connector being connected to a trigger branch comprising, in series: a point of connection (297) of the clamping unit, to the connector (300) for connection to the respective rotor phase; a thyristor (295) for triggering the clamping unit; the clamping element (290); a diode (296); and the point of connection (297) to the connector (300) for connection to the respective rotor phase, said clamping element comprising at least one passive voltage-dependent resistor element (291, 292, 293, 294) for providing a clamping voltage over the rotor windings.

2. A control system according to claim 1, wherein the clamping element (290) comprises a plurality of passive voltage-dependent resistor elements (291, 292, 293, 294), arranged in parallel with at least one varistor, one zener diode or one suppression diode.

3. A control system according to claim 1, wherein the clamping unit further comprises a resistor (298) coupled in parallel with the clamping element (290).

4. A control system according to claim 1, wherein the clamping unit is arranged to be triggered from the non-operating state to the operating state when the voltage over the DC-link or the rotor windings rises above a pre-determined level, or when the current in the rotor-windings or the stator-windings rise a pre-determined level.

5. A double-fed induction generator (DFIG) system comprising a rotor (1) having rotor windings and a stator (2) having stator windings connectable to a grid for electric power distribution, said double-fed induction generator system further comprising a control system according to claim 1, wherein the rotor inverter (71-73) is connected to the rotor windings of the generator, the grid inverter (74-76) is connected to the grid, and the clamping unit (190) is connected over the rotor windings.

6. A control system according to claim 2, wherein the clamping unit comprises, for each phase of the rotor, a connector (300) for connection to the respective rotor phase, each connector being connected to a trigger branch comprising, in series: a point of connection (297) of the clamping unit, to the connector (300) for connection to the respective rotor phase; a thyristor (295) for triggering the clamping unit; the clamping element (290); a diode (296); and the point of connection (297) to the connector (300) for connection to the respective rotor phase.

7. A control system according to claim 6, wherein the clamping unit further comprises a resistor (298) coupled in parallel with the clamping element (290).

8. A control system according to claim 7, wherein the clamping unit is arranged to be triggered from the non-operating state to the operating state when the voltage over the DC-link or the rotor windings rises above a pre-determined level, or when the current in the rotor-windings or the stator-windings rise a pre-determined level.

9. A control system according to claim 6, wherein the clamping unit is arranged to be triggered from the non-operating state to the operating state when the voltage over the DC-link or the rotor windings rises above a pre-determined level, or when the current in the rotor-windings or the stator-windings rise a pre-determined level.

10. A control system according to claim 2, wherein the clamping unit further comprises a resistor (298) coupled in parallel with the clamping element (290).

11. A control system according to claim 10, wherein the clamping unit is arranged to be triggered from the non-operating state to the operating state when the voltage over the DC-link or the rotor windings rises above a pre-determined level, or when the current in the rotor-windings or the stator-windings rise a pre-determined level.

12. A double-fed induction generator (DFIG) system comprising a rotor (1) having rotor windings and a stator (2) having stator windings connectable to a grid for electric power distribution, said double-fed induction generator system further comprising a control system according to claim 11, wherein the rotor inverter (71-73) is connected to the rotor windings of the generator, the grid inverter (74-76) is connected to the grid, and the clamping unit (190) is connected over the rotor windings.

13. A control system according to claim 2, wherein the clamping unit is arranged to be triggered from the non-operating state to the operating state when the voltage over the DC-link or the rotor windings rises above a pre-determined level, or when the current in the rotor-windings or the stator-windings rise a pre-determined level.

14. A double-fed induction generator (DFIG) system comprising a rotor (1) having rotor windings and a stator (2) having stator windings connectable to a grid for electric power distribution, said double-fed induction generator system further comprising a control system according to claim 2, wherein the rotor inverter (71-73) is connected to the rotor windings of the generator, the grid inverter (74-76) is connected to the grid, and the clamping unit (190) is connected over the rotor windings.

15. A method for protecting the converter in a power generation system comprising a double-fed induction generator (DFIG) comprising a rotor (1) having rotor windings, a stator (2) having stator windings connected to a grid for electric power distribution and a control system comprising a converter (170, 171), said converter comprising a rotor-inverter (71-73) connected to the rotor windings of the generator, a grid-inverter (74-76) connected to the grid and/or to the stator windings, and a DC-link (77) for feeding the rotor-inverter; whereby the method comprises the steps of:

connecting a clamping unit (190) having a clamping element over the rotor windings, said clamping unit comprising a clamping element (290) arranged so that when the clamping unit is in a non-operating state, currents in the rotor windings cannot pass through said clamping element, and when the clamping unit is in an operating state, currents in the rotor windings can pass through said clamping element, said clamping element comprising at least one passive voltage-dependent resistor element (291, 292, 293, 294) for providing a clamping voltage over the rotor windings; and triggering the clamping unit from its non-operating state to its operating state when an over-current is detected in the rotor windings.

16. A method according to claim 15, wherein the clamping unit is triggered from the non-operating state to the operating state when the voltage over the DC-link rises above a pre-determined level.

17. A method according to claim 15, wherein the clamping unit is triggered from the non-operating state to the operating state when the voltage over the rotor-windings rises above a pre-determined level.

18. A method according to claim 15, wherein the clamping unit is triggered from the non-operating state to the operating state when the currents in the rotor-windings rise above a pre-determined level.

19. A method according to claim 15, wherein the clamping unit is triggered from the non-operating state to the operating state when the currents in the stator-windings rise above a pre-determined level.

* * * * *